(12) United States Patent
Perregaux et al.

(10) Patent No.: US 6,654,056 B1
(45) Date of Patent: Nov. 25, 2003

(54) GEOMETRIC CONFIGURATIONS FOR PHOTOSITES FOR REDUCING MOIRÉ PATTERNS

(75) Inventors: Alain E. Perregaux, Rochester, NY (US); Jagdish C. Tandon, Fairport, NY (US); Paul A. Hosier, Rochester, NY (US); Roger L. Triplett, Penfield, NY (US); Xiao-Fan Feng, Vancouver, WA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/211,765

(22) Filed: Dec. 15, 1998

(51) Int. Cl.⁷ .................. H04N 3/14; H04N 5/335; H04N 9/04; H04N 9/083
(52) U.S. Cl. .............. 348/275; 348/273; 348/272; 348/266; 348/280; 358/482; 358/483; 358/513; 358/514
(58) Field of Search .................. 358/513, 514, 358/482, 483; 348/266, 272, 273, 275, 280

(56) References Cited

U.S. PATENT DOCUMENTS

| | | | |
|---|---|---|---|
| 3,971,065 A * | 7/1976 | Bayer | 348/276 |
| 4,602,289 A * | 7/1986 | Sekine | 348/315 |
| 5,031,032 A | 7/1991 | Perregaux | |
| 5,473,513 A | 12/1995 | Quinn | |
| 5,488,239 A | 1/1996 | Jung | |
| 5,552,828 A | 9/1996 | Perregaux | |
| 5,886,353 A * | 3/1999 | Spivey et al. | 250/370.09 |

* cited by examiner

Primary Examiner—Andrew Christensen
Assistant Examiner—Brian C Genco
(74) Attorney, Agent, or Firm—P. Daebeler

(57) ABSTRACT

Geometric configurations for photosites found on photosensitive chips for creating electrical signals from an original image, as would be found, for example, in a digital scanner, copier, facsimile machine, or other document generating or reproducing device. The photosensitive chips are mounted on a substrate to form a photosensitive array in a full width scanner or other photosensitive device. The geometric configurations reduce the Moiré patterns to provide a higher quality image.

6 Claims, 11 Drawing Sheets

GEOMETRIC CONFIGURATIONS FOR PHOTOSITES FOR REDUCING MOIRÉ PATTERNS

Attention is directed to application U.S. patent application Ser. No. 09/661,261, filed Dec. 15, 1998, entitled, "GEOMETRIC CONFIGURATIONS FOR PHOTOSITES FOR REDUCING MOIRÉ PATTERNS". The disclosures of this application each of which are hereby incorporated by reference in their entirety.

FIELD OF THE INVENTION

The present invention relates to photosensitive chips for creating electrical signals from an original image, as would be found, for example, in a digital scanner, copier, facsimile machine, or other document generating or reproducing device.

BACKGROUND OF THE INVENTION

Image sensor arrays typically comprise a photosensitive array of photosites which raster scan an image bearing document and convert the microscopic image areas viewed by each photosite to image signal charges. Each photosite includes one or more photodiodes, photogates or other photodetection devices. Following an integration period, the image signal charges are amplified and transferred as an analog video signal to a common output line or bus through successively actuated multiplexing transistors.

For high-performance image sensor arrays, a preferred design includes a photosensitive array of photosites of a width comparable to the width of a page being scanned, to permit one-to-one imaging generally without the use of reductive optics as taught in U.S. Pat. No. 5,473,513. In order to provide such a "full-width" array, however, relatively large silicon structures must be used to define the large number of photosites as shown in FIG. 1. A preferred technique to create such a large array is to assemble several photosensitive chips $10_1$ through $10_N$ end to end on a base substrate 20, each chip 10 defining a small photosensitive array thereon. The base substrate 20 is preferably a form of ceramic such as alumina, and the chips 10 are preferably made of silicon or another semiconductor material. N is defined as any whole number.

Alternatively, chip 10 may represent a charged-coupled device (CCD) or another type of photosensitive semiconductor chip.

The chips 10, which are assembled end to end to form one full-width array, are created by first creating the circuitry for a plurality of individual chips 10 on a single silicon wafer. The silicon wafer is then cut, or "diced," around the circuit areas to yield discrete chips 10. Typically, the technique for dicing the chips 10 includes a combination of chemical etching and mechanical sawing. Because, on each chip 10, the photosites are spaced with high resolution from one end of a chip 10 to the other, the cutting of the chips 10 from the wafer requires precision dicing. It would be desirable to dice each individual chip 10 with a precise dimension along the photosensitive array of photosites, so that, when a series of chips 10 are assembled end-to-end to form a single page-width photosensitive array, there is a minimum disruption of spacing from an end photosite on one chip 10 to a neighboring photosite at the end of a neighboring chip 10. Typically, there is a small gap 30 between two adjacent chips 10. Ideally, the geometric centers of the photosites should be collinear and the photosites should be uniformly spaced across an entire full-width photosensitive array regardless of the configuration of silicon chips 10 forming the photosensitive array. In the prior art, photosites in the chips 10 were made in a square or rectangular shape to provide a repetitive structure of photosites 40. In this way, the repetitive structure was maintained on a chip-to-chip basis, particularly in the gaps 30 between adjacent chips 10 as shown in FIG. 2.

As shown in FIG. 2, the photosites 40 typically have a rectangular shape, wherein each photosite 40 is smaller in the x-direction (fast scan direction) than the y-direction (slow scan direction or direction of document motion) to allow for electrical isolation, to limit cross talk and to allow for conductive traces to run between photosites. As a result, the optical modulation transfer function (MTF) of the system is higher in the x-direction (fast scan direction) than in the y-direction (slow scan direction). The fact that the document to be scanned moves in the y-direction further reduces the y-MTF. However, the negative consequences of the high x-MTF need to be addressed.

For example, half-tone documents typically have a certain dot frequency in the x-direction. Since a beat occurs between the dot frequency and the frequency of the photosite locations, undesirable Moiré patterns appear on the reproduced documents. Therefore, there is a need for a new photosensitive array of photosites, which reduces or eliminates the Moiré patterns particularly in the x-direction (fast scan direction).

As shown in FIG. 3, there were attempts in the prior art to improve image quality at the boundary of adjacent chips by providing photosites having two different shapes on photosensitive chips. This pattern was generally disclosed in U.S. Pat. No. 5,552,828. The regular photosites 60 have a generally square shape or slightly rectangular shape whereas the end photosites 70 have a trapezoidal shape. The advantage of the generally trapezoidal shape of end photosites 70 is that, while the overall width of each end photosite 70 is equal to that of each regular photosites 60, the geometric center of the end photosites 70 is made slightly closer to the edge of the chip 10 to help compensate for any chip spacing problems between the chips 10. However, this arrangement of shapes does not reduce or eliminate Moiré patterns.

U.S. Pat. No. 5,031,032 discloses a pattern of photosites for a full width photosensitive array with photosites of different colors. Although multiple geometric shapes are used to form a rectangular photosite with the three different primary colors, this arrangement of shapes does not reduce or eliminate Moiré patterns.

SUMMARY OF THE INVENTION

According to the present invention, there is provided a photosensitive array having a fast scan direction and a slow scan direction, wherein the photosensitive array includes an array of complementary shaped photosites on a chip, wherein the largest dimension of at least one photosite on a chip in the fast scan direction is longer than a pitch between two adjacent photosites in the fast scan direction. Preferably, the largest dimension of each photosite on a chip in the fast scan direction is longer than a pitch between two adjacent photosites. The photosensitive array may be a linear array or a two dimensional array. The array preferably extends from one end of the chip to the other, and the array of complementary shaped photosites is preferably buttable. The array can be used in single chip applications. However, the complementary shaped photosites on a chip are preferably adapted for end to end assembly with like arrays on like chips to form a full width array.

According to the present invention, there is provided a photosensitive array having a fast scan direction and a slow scan direction, wherein the photosensitive array includes an array of complementary triangular, trapezoidal or pentagonal shaped photosites on a chip extending from one end of the chip to the other. The photosensitive array reduces the modulation transfer function in the fast scan direction to reduce Moiré patterns. Each photosite has a photodetection device such as a photodiode or photogate and each photosite has the same surface area. A photosensitive array can be mounted on a substrate adjacent to a second photosensitive array of complementary shaped photosites wherein the last shape of the photosensitive array and the first shape of the second photosensitive array are complementary. A plurality of the photosensitive arrays can be juxtaposed and mounted on a rectangular substrate to form a full width photosensitive array. In several embodiments, the photosensitive arrays on the chips are buttable. The photosensitive array may be a linear array or two dimensional array. Further, the photosensitive array may be used independently to scan an image or can be juxtaposed with one or more photosensitive arrays to scan an image.

According to the present invention, there is provided a photosensitive array having a fast scan direction and a slow scan direction, wherein the photosensitive array includes an array of interlocking photosites on a chip extending from one end of the chip to the other. The photosensitive array reduces the modulation transfer function in the fast scan direction to reduce Moiré patterns. Each interlocking photosite has a photodetection device such as a photodiode or photogate and each photosite has the same surface area. A photosensitive array can be mounted on a substrate adjacent to a second photosensitive array, wherein the last interlocking photosite of the photosensitive array and the first interlocking photosite of the second photosensitive array have an outer edge, which is parallel to the chip edge. A plurality of the photosensitive arrays can be juxtaposed and mounted on a rectangular substrate to form a full width photosensitive array. The photosensitive arrays on the chips are buttable. Further, one photosensitive array may be used to scan an image or can be juxtaposed with one or more photosensitive arrays to scan an image. The photosensitive array may be a linear array or two dimensional array. The largest dimension of at least one photosite in the fast scan direction is longer than the pitch between adjacent photosites in the fast scan direction. Preferably, the largest dimension of each photosite in the fast scan direction is longer than the pitch between adjacent photosites.

According to another embodiment of the present invention, there is provided a photosensitive array having a fast scan direction and a slow scan direction, wherein the photosensitive array includes an array of photosites on the chip extending from one end of the chip to the other including slanted photosites and an end photosite, the slanted photosites being generally in the shape of a parallelogram without right angles, the end photosite being generally in the shape of a trapezoid having a first edge, a second edge, an inner edge facing the slanted photosites and an outer edge facing the chip end, wherein the outer edge forms two 90 degree angles with the first and second edges. Preferably, the outer edge is shorter than the inner edge. Each photosite has a photodetection device such as a photodiode or photogate, and each photosite has the same surface area. In addition, the photosites are collinear. A photosensitive array can be mounted on a substrate adjacent to a second photosensitive array. A plurality of the photosensitive arrays can be juxtaposed and mounted on a rectangular substrate in an end to end relationship and extending from one end of the substrate to the other to form a full width photosensitive array. Further, one photosensitive array may be used to scan an image or can be juxtaposed with one or more photosensitive arrays to scan an image. The photosensitive array may be a linear array or two dimensional array. The largest dimension of at least one photosite in the fast scan direction is longer than the pitch between adjacent photosites in the fast scan direction. Preferably, the largest dimension of each photosite in the fast scan direction is longer than the pitch between adjacent photosites.

According to another embodiment, there is provided a digital copier including a raster scanner scanning documents to generate digital image signals; a controller directing a raster output scanner to expose a photoconductive belt, to create an electrostatic latent image based on image signals received from the raster input scanner; a developer applying toner to the latent image; a transfer station transferring the toner of the latent image to a sheet of paper; and a fuser permanently affixing the toner to the sheet of paper. A raster input scanner includes a plurality of chips, which are juxtaposed and mounted on a substrate forming an array of complementary shaped photosites, wherein the complimentary shaped photosites consist of trapezoids, triangles and pentagons. The trapezoidal shaped photosites and pentagonal shaped photosites can be buttable. Each complementary shape has a photodetection device. Each complementary shape has the same surface area. The pentagonal shaped photosites are collinear. The photosensitive array may be a linear array or two dimensional array.

Alternatively, the raster input scanner includes a plurality of chips, which are juxtaposed and mounted on a substrate forming an array of interlocking photosites. The last interlocking photosite of the photosensitive array and the first interlocking photosite of the second photosensitive array have an outer edge, which is parallel to the chip edge. Therefore, the photosensitive arrays are buttable. Each complementary shape has the same surface area, and the interlocking photosites are collinear. The photosensitive array may be a linear array or two dimensional array.

Alternatively, the raster scanner includes a plurality of generally rectangular chips, which are juxtaposed and mounted on a substrate forming an array of photosites including slanted photosites and an end photosite, the slanted photosites being generally in the shape of a parallelogram without right angles, the end photosite being generally in the shape of a trapezoid having a first edge, a second edge, an inner edge facing the slanted photosites and an outer edge facing the chip end. The outer edge forms two 90 degree angles with the first and second edges. Each photosite has a photodetection device, and each photosite has the same surface area. The photosites are collinear. The photosensitive array may be a linear array or two dimensional array.

DETAILED DESCRIPTION OF THE PRESENT INVENTION

Figure 1:
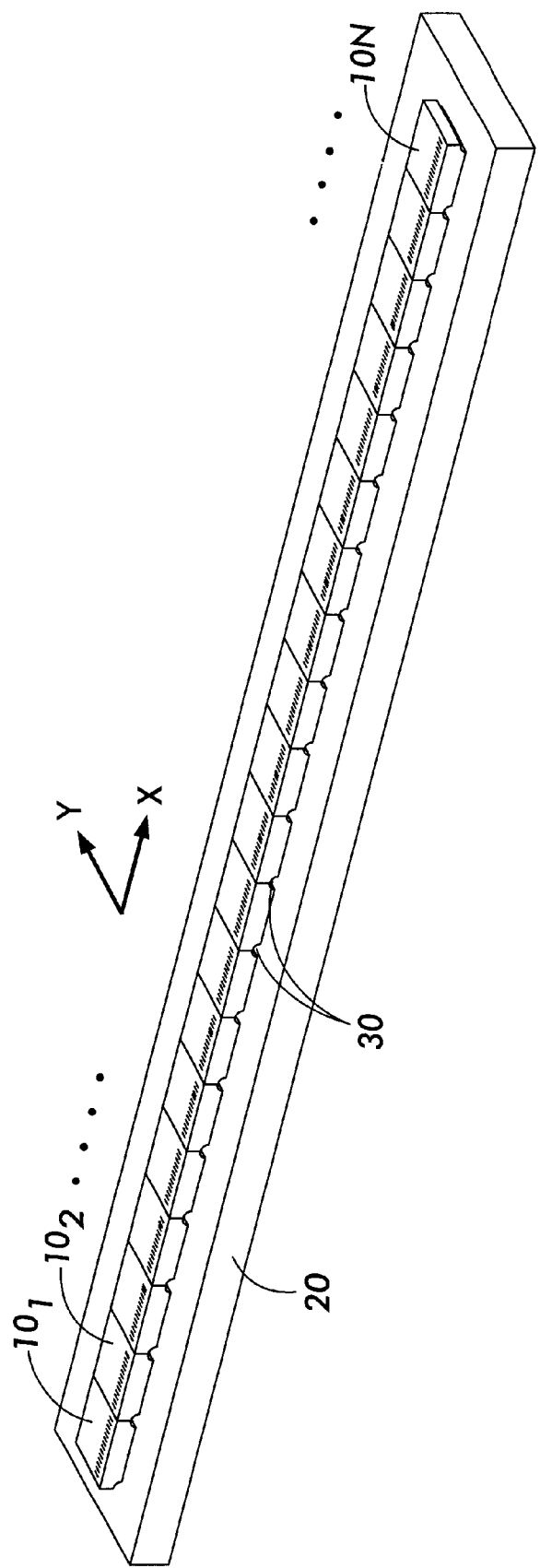
FIG. 1 is a perspective view showing a base substrate having a plurality of assembled photosensitive chips mounted thereon, which form a photosensitive array relevant to the present invention.
Figure 2:
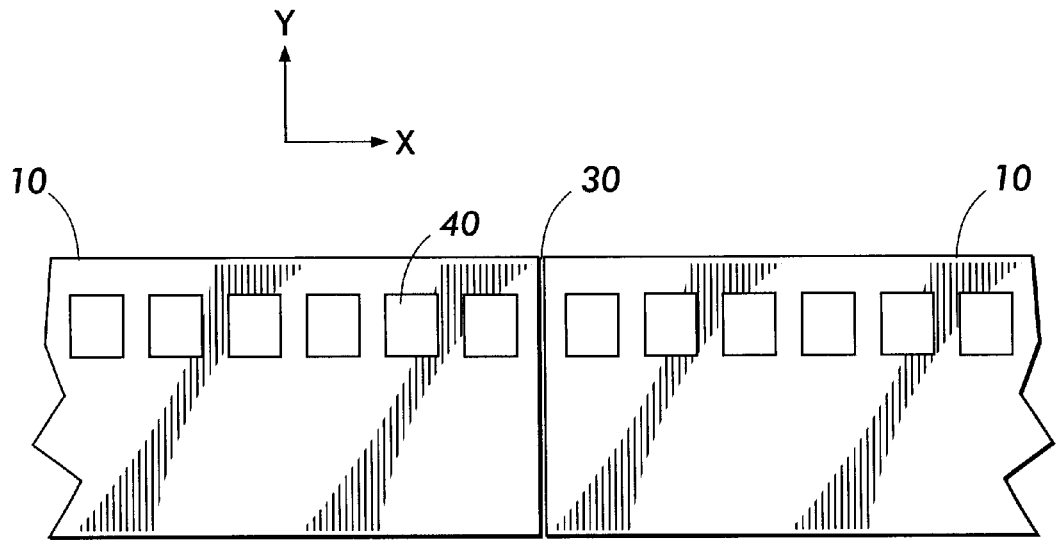
FIG. 2 is a plan view showing a photosensitive array of photosites on two photosensitive chips in the prior art.
Figure 3:
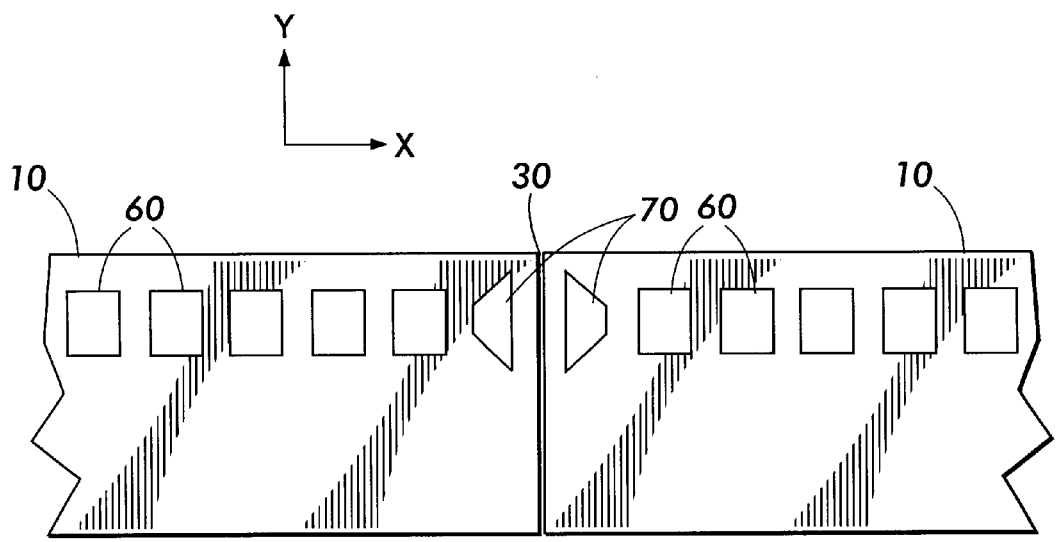
FIG. 3 is a plan view showing portions of two photosensitive chips, showing regular sites and end photosites thereon in the prior art.

In each of the following Figures, there is shown a plan view of the relevant portions of two photosensitive chips 10 at the general area of juxtaposition along a photosensitive array comprising a plurality of such chips 10. Each chip 10 is preferably made of silicon or another semiconductor material. In each plan view is shown only the main surfaces of the chips 10, having photosensitive structures thereon. At the juxtapositional area between the chips 10 is a very narrow gap 30, which represents spacing between the edges of each chip 10. Each chip 10 includes on the main surface thereof a plurality of photosites, which extend from one end of each chip 10 to the other to form a photosensitive array on each chip 10. Each photosite represents the effective photosensitive area associated with a circuit (not shown) forming a photosensor in each chip 10. Each photosite includes one or more photodetection devices such as photodiodes or photogates.

A chip 10 may be used by itself in a scanning device to scan an image. Although a chip 10 can be used in a single chip application to sense images and reduce Moiré patterns, a plurality chips 10 are preferably mounted end to end on a substrate 20, which is preferably made of a ceramic such as alumina, to form a full width photosensitive array for sensing images on a document. Preferably the full width photosensitive array is at least as long as one side of the document. However, the chip 10 may also represent a photosensitive CCD array or other photosensitive array, and these chips 10 may be assembled to form a full width photosensitive array. For the purposes of the present invention, the most relevant attribute of each photosensitive array is the geometric shape and spacing of the photosites, and the preferred embodiments are photosensitive arrays on chips 10.

FIGS. 4–19 show preferred embodiments of the invention, which lower the modulation transfer function in the x-direction or fast scan direction by spreading the photosites over larger regions to reduce the Moiré patterns and improve image quality. This is accomplished in the preferred embodiments because the largest dimension of the photosites in the fast scan direction is preferably longer than the pitch between adjacent photosites in the fast scan direction. Pitch is the center to center spacing of adjacent photosites. Further, it is preferable that each outer photosite near the edge of each chip 10, no matter what the specific shape thereof, be of a surface area equal to the surface area defined by each inner photosite. By having equal surface areas defined by each photosite, the overall light sensitivity of all of the photosites, no matter of which type, can be made substantially equal.

Further, several of the embodiments employ photosites or photocollection areas, which are buttable. This means that the edge of the photosite or photocollection area closest to the chip edge is also parallel to the chip edge. Further, a photosensitive array may be used in a scanning device to scan an image or can be juxtaposed with one or more photosensitive arrays. Each chip 10 in each embodiment of the present invention may be used for single chip applications or to provide a full width array. Moreover, it is understood by one having ordinary skill in the art that a square is a type of rectangle.

Figure 4:
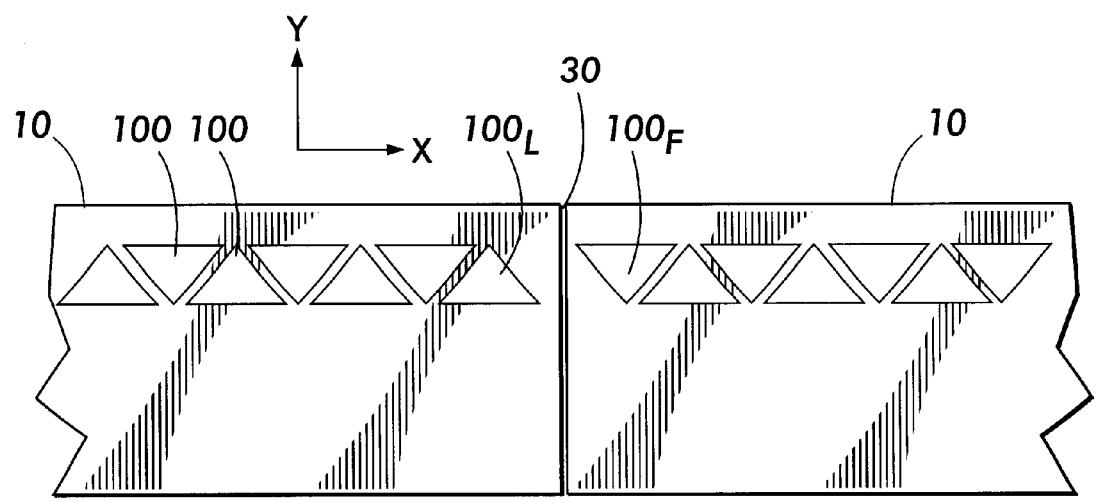
FIG. 4 is a plan view showing portions of two photosensitive arrays of photosites on two juxtaposed photosensitive chips in a first preferred embodiment of the present invention.

FIG. 4 shows a plan view of the relevant portions of two chips 10 at the general area of juxtaposition along a full width linear photosensitive array comprising a plurality of the chips 10, each having a linear photosensitive array of the geometric shapes according to the first embodiment of the present invention. In the first embodiment, the geometric shapes are complementary triangles 100. Each complementary triangle 100 consists of one photosite. Each chip 10 has two outer photosites denoted as $100_F$ (first complementary triangular shaped photosite) and $100_L$ (last complementary triangular shaped photosite). The other complementary triangular shaped photosites 100 are inner photosites. All of the photosites preferably have the same surface area and are regularly spaced on the chips 10. The advantage of the geometric configuration of the first embodiment is that it lowers the modulation transfer function in the x-direction or fast scan direction by spreading the photosites over larger regions, and thus reduces the Moiré patterns to improve image quality. One chip 10 shown in FIG. 4 may be used in a scanning device or mounted to a substrate 20 with one or more chips 10 to form a full width linear array as shown in FIGS. 1 and 4.

Figure 5:
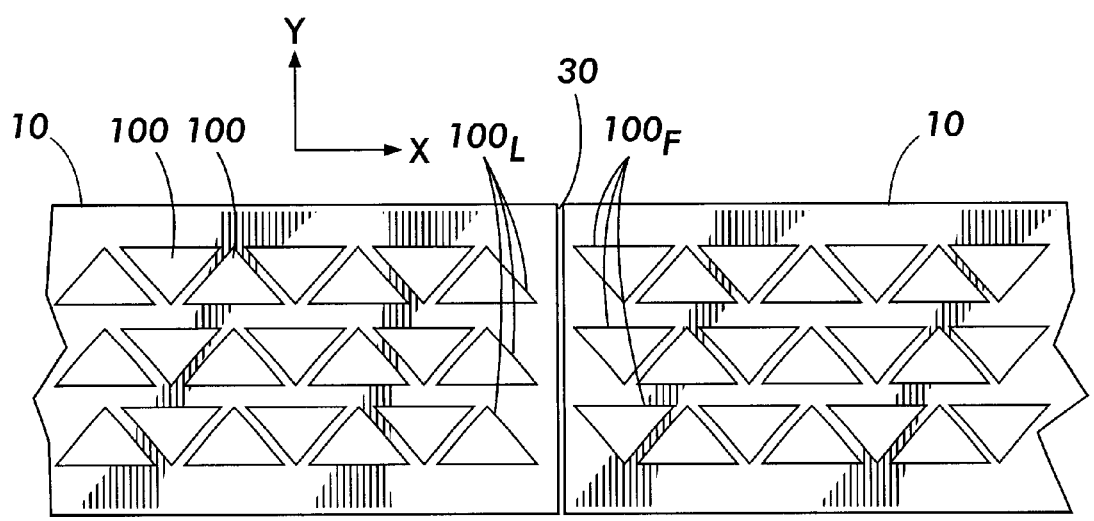
FIG. 5 is a plan view showing portions of two photosensitive arrays of photosites on two juxtaposed photosensitive chips in a second preferred embodiment of the present invention.

FIG. 5 shows a plan view of the relevant portions of two chips 10 at the general area of juxtaposition along a full width two dimensional photosensitive array comprising a plurality of the chips 10, each having a two dimensional photosensitive array of the geometric shapes according to the second embodiment of the present invention. Preferably, there are three rows of geometric shapes for the three primary colors. In the second embodiment, the geometric shapes are complementary triangles 100. Each complementary triangle 100 consists of one photosite. Each chip 10 has outer photosites denoted as $100_F$ (first complementary triangular shaped photosite) and $100_L$ (last complementary triangular shaped photosite). The other complementary triangular shaped photosites 100 are inner photosites. All of the photosites preferably have the same surface area and are regularly spaced on the chips 10. The advantage of the geometric configuration of the second embodiment is that it lowers the modulation transfer function in the x-direction or fast scan direction by spreading the photosites over larger regions, and thus reduces the Moiré patterns to improve image quality. One chip 10 shown in FIG. 5 may be used in a scanning device or mounted to a substrate 20 with one or more chips 10 to form a full width two dimensional array as shown in FIGS. 1 and 5.

Figure 6:
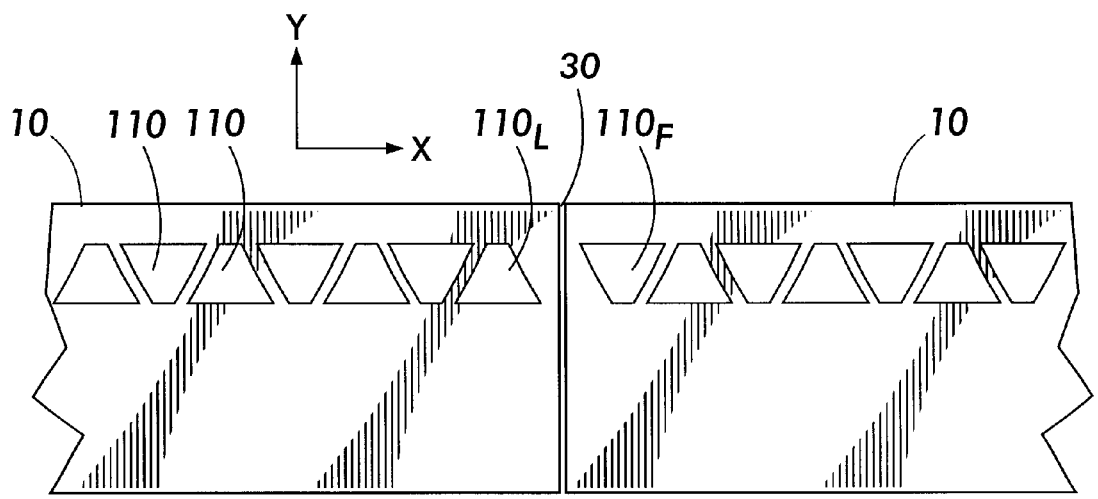
FIG. 6 is a plan view showing portions of two photosensitive arrays of photosites on two juxtaposed photosensitive chips in a third preferred embodiment of the present invention.

FIG. 6 shows a plan view of the relevant portions of two chips 10 at the general area of juxtaposition along a full width linear photosensitive array comprising a plurality of the chips 10, each having a linear photosensitive array of the geometric shapes according to the third embodiment of the present invention. In the third embodiment, the geometric shapes are complementary trapezoids 110. Each complementary trapezoid 110 consists of one photosite. Each chip 10 has two outer photosites denoted as $110_F$ (first complementary trapezoidal shaped photosite) and $110_L$ (last complementary trapezoidal shaped photosite). The other complementary trapezoidal shaped photosites 110 are inner photosites. All of the photosites preferably have the same surface area and are regularly spaced on the chips 10. The advantage of the geometric configuration of the third embodiment is that it lowers the modulation transfer function in the x-direction or fast scan direction by spreading the photosites over larger regions, and thus reduces the Moiré patterns to improve image quality. One chip 10 shown in FIG. 6 may be used in a scanning device or mounted to the substrate 20 with one or more chips 10 to form a full width linear array as shown in FIGS. 1 and 6.

Figure 7:
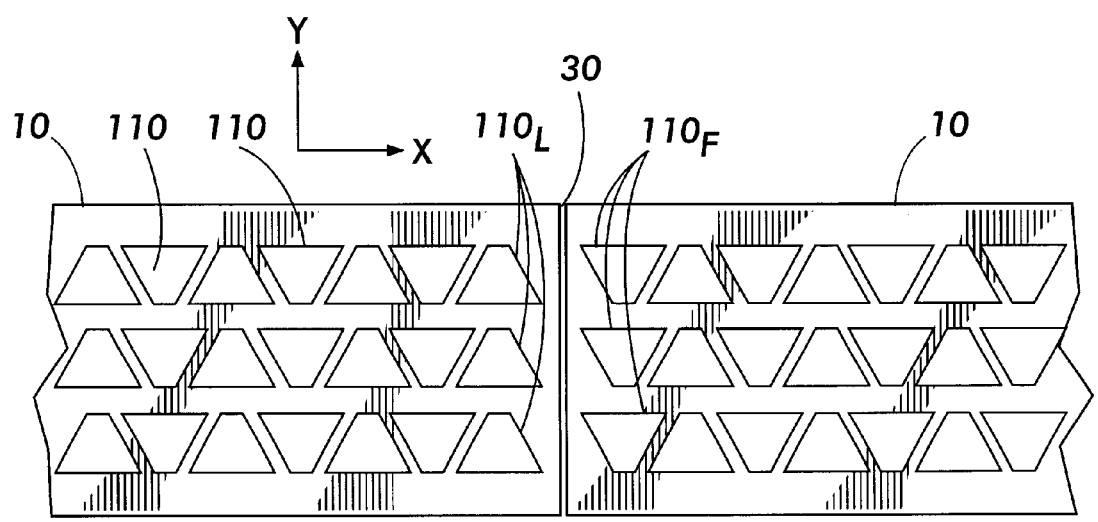
FIG. 7 is a plan view showing portions of two photosensitive arrays of photosites on two juxtaposed photosensitive chips in a fourth preferred embodiment of the present invention.

FIG. 7 shows a plan view of the relevant portions of two chips 10 at the general area of juxtaposition along a full width two dimensional photosensitive array comprising a plurality of the chips 10, each having a two dimensional photosensitive array of the geometric shapes according to the fourth embodiment of the present invention. In the fourth embodiment, the geometric shapes are complementary trapezoids 110. Preferably, there are three rows of geometric shapes for the three primary colors. Each complementary trapezoid 110 consists of one photosite. Each chip 10 has outer photosites denoted as $110_F$ (first complementary trapezoidal shaped photosite) and $110_L$ (last complementary trapezoidal shaped photosite). The other complementary trapezoidal shaped photosites 110 are inner photosites. All of the photosites preferably have the same surface area and are regularly spaced on the chips 10. The advantage of the geometric configuration of the fourth embodiment is that it lowers the modulation transfer function in the x-direction or fast scan direction by spreading the photosites over larger regions, and thus reduces the Moiré patterns to improve image quality. One chip 10 shown in FIG. 7 may be used in a scanning device or mounted to a substrate 20 with one or more chips 10 to form a full width two dimensional array as shown in FIGS. 1 and 7.

Figure 8:
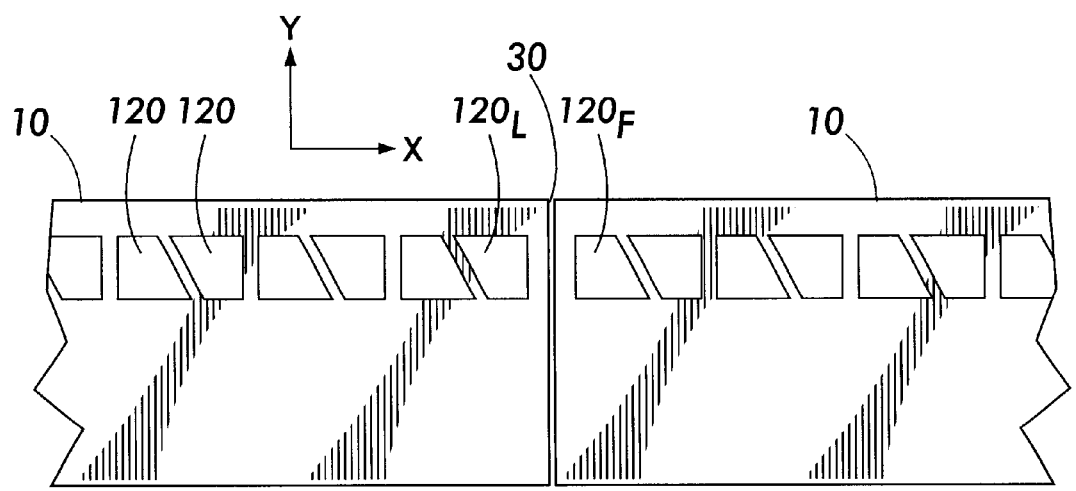
FIG. 8 is a plan view showing portions of two photosensitive arrays of photosites on two juxtaposed photosensitive chips in a fifth preferred embodiment of the present invention.

FIG. 8 shows a plan view of the relevant portions of two chips 10 at the general area of juxtaposition along a full width linear photosensitive array comprising a plurality of the chips 10, each having a linear photosensitive array of the geometric shapes according to the fifth embodiment of the present invention. In the fifth embodiment, the geometric shapes are buttable complementary trapezoids 120. Each buttable complementary trapezoid 120 consists of one photosite. Each chip 10 has two outer photosites denoted as $120_F$ (first buttable complementary trapezoidal shaped photosite) and $120_L$ (last buttable complementary trapezoidal shaped photosite). The other buttable complementary trapezoidal shaped photosites 120 are inner photosites. All of the photosites preferably have the same surface area and are regularly spaced on the chips 10. The advantage of the geometric configuration of the fifth embodiment is that it lowers the modulation transfer function in the x-direction or fast scan direction by spreading the photosites over larger regions, and thus reduces the Moiré patterns to improve image quality. In addition, the outer photosites $120_F$ and $120_L$ are buttable, which further improves image quality. One chip 10 shown in FIG. 8 may be used in a scanning device or mounted to a substrate 20 with one or more chips 10 to form a full width linear array as shown in FIGS. 1 and 8.

Figure 9:
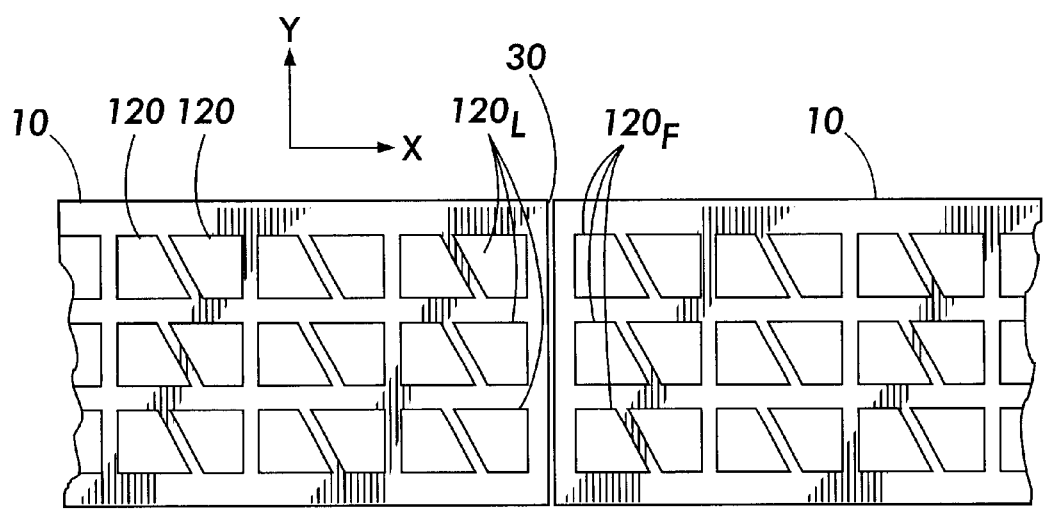
FIG. 9 is a plan view showing portions of two photosensitive arrays of photosites on two juxtaposed photosensitive chips in a sixth preferred embodiment of the present invention.

FIG. 9 shows a plan view of the relevant portions of two chips 10 at the general area of juxtaposition along a full width two dimensional photosensitive array comprising a plurality of the chips 10, each having a two dimensional photosensitive array of the geometric shapes according to the sixth embodiment of the present invention. In the sixth embodiment, the geometric shapes are buttable complementary trapezoids 120. Preferably, there are three rows of geometric shapes for the three primary colors. Each buttable complementary trapezoid 120 consists of one photosite. Each chip 10 has outer photosites denoted as $120_F$ (first buttable complementary trapezoidal shaped photosite) and $120_L$ (last buttable complementary trapezoidal shaped photosite). The other buttable complementary trapezoidal shaped photosites 120 are inner photosites. All of the photosites preferably have the same surface area and are regularly spaced on the chips 10. The advantage of the geometric configuration of the sixth embodiment is that it lowers the modulation transfer function in the x-direction or fast scan direction by spreading the photosites over larger regions, and thus reduces the Moiré patterns to improve image quality. In addition, the outer photosites $120_F$ and $120_L$ are buttable, which further improves image quality. One chip 10 shown in FIG. 9 may be used in a scanning device or mounted to a substrate 20 with one or more chips 10 to form a full width two dimensional array as shown in FIGS. 1 and 9.

Figure 10:
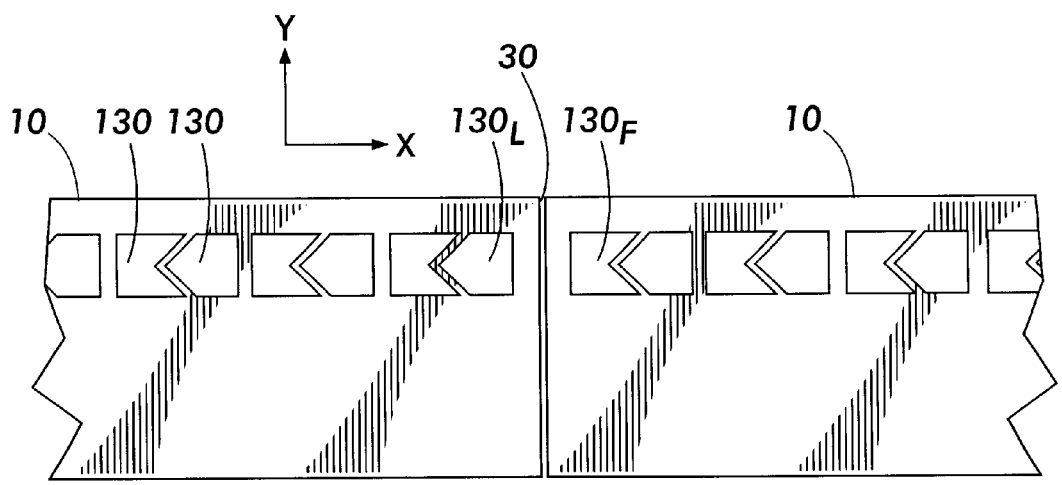
FIG. 10 is a plan view showing portions of two photosensitive arrays of photosites on two juxtaposed photosensitive chips in a seventh preferred embodiment of the present invention.

FIG. 10 shows a plan view of the relevant portions of two chips 10 at the general area of juxtaposition along a full width linear photosensitive array comprising a plurality of the chips 10, each having a linear photosensitive array of the geometric shapes according to the seventh embodiment of the present invention. In the seventh embodiment, the geometric shapes are buttable complementary pentagons 130. Each buttable complementary pentagon 130 consists of one photosite. Each chip 10 has two outer photosites denoted as $130_F$ (first buttable complementary pentagonal shaped photosite) and $130_L$ (last buttable complementary pentagonal shaped photosite). The other buttable complementary pentagonal shaped photosites 130 are inner photosites. All of the photosites preferably have the same surface area and are regularly spaced on the chips 10. The advantage of the geometric configuration of the seventh embodiment is that it lowers the modulation transfer function in the x-direction or fast scan direction by spreading the photosites over larger regions, and thus reduces the Moiré patterns to improve image quality. In addition, the geometric centers of all of the photosites are preferably collinear and the outer photosites $130_F$ and $130_L$ are buttable, which further improves image quality. Hereinafter, if the geometric centers of all the photosites are collinear, the photosites are said to be collinear. One chip 10 shown in FIG. 10 may be used in a scanning device or mounted to a substrate 20 with one or more chips 10 to form a full width linear array as shown in FIGS. 1 and 10.

Figure 11:
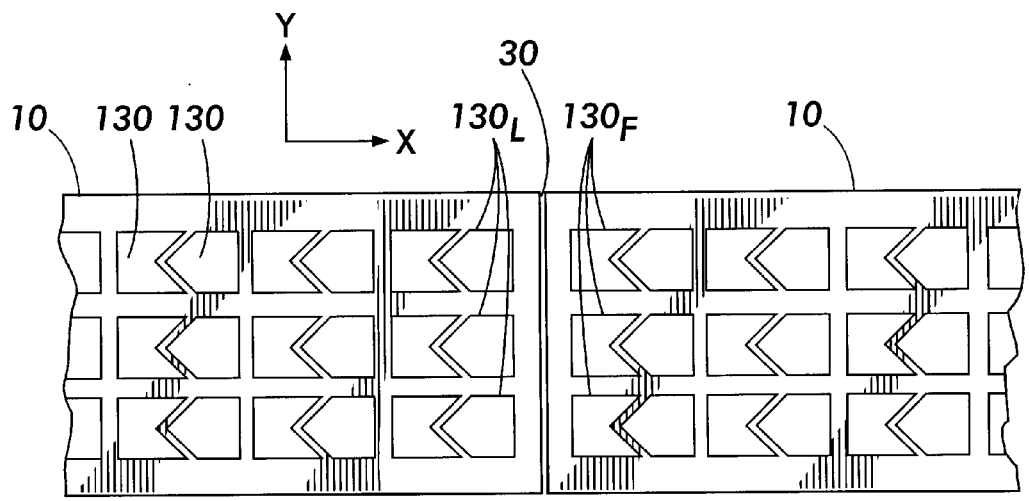
FIG. 11 is a plan view showing portions of a photosensitive array of photosites on two juxtaposed photosensitive chips in an eighth preferred embodiment of the present invention.

FIG. 11 shows a plan view of the relevant portions of two chips 10 at the general area of juxtaposition along a full width two dimensional photosensitive array comprising a plurality of the chips 10, each having a two dimensional photosensitive array of the geometric shapes according to the eighth embodiment of the present invention. In the eighth embodiment, the geometric shapes are buttable complementary pentagons 130. Preferably, there are three rows of geometric shapes for the three primary colors. Each buttable complementary pentagon 130 consists of one photosite. Each chip 10 has outer photosites denoted as $130_F$ (first buttable complementary pentagonal shaped photosite) and $130_L$ (last buttable complementary pentagonal shaped photosite). The other buttable complementary pentagonal shaped photosites 130 are inner photosites. All of the photosites preferably have the same surface area and are regularly spaced on the chips 10. The advantage of the geometric configuration of the eighth embodiment is that it lowers the modulation transfer function in the x-direction or fast scan direction by spreading the photosites over larger regions, and thus reduces the Moiré patterns to improve image quality. In addition, the geometric centers of all of the photosites are preferably collinear and the outer photosites $130_F$ and $130_L$ are buttable, which further improves image quality. One chip 10 shown in FIG. 11 may be used in a scanning device or mounted to a substrate 20 with one or more chips 10 to form a full width two dimensional array as shown in FIGS. 1 and 11.

Figure 12:
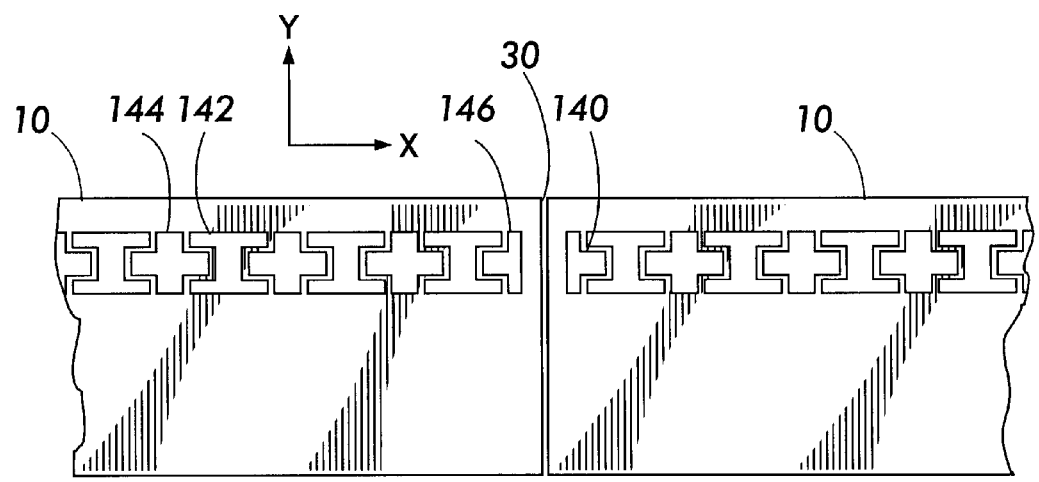
FIG. 12 is a plan view showing portions of two photosensitive arrays of photosites on two juxtaposed photosensitive chips in a ninth preferred embodiment of the present invention.

FIG. 12 shows a plan view of the relevant portions of two chips 10 at the general area of juxtaposition along a full width linear photosensitive array comprising a plurality of the chips 10, each having a linear photosensitive array of the geometric shapes according to the ninth embodiment of the present invention. In the ninth embodiment, the linear photosensitive array is an array of interlocking photosites 140, 142, 144 and 146. Each chip 10 has a first interlocking photosite 140 and a last interlocking photosite 146. The first interlocking photosite 140 and a last interlocking photosite 146 are also called outer interlocking photosites. The outer interlocking photosites 140 and 146 are parallel to the chip edge. The other interlocking photosites are called inner interlocking photosites and are denoted as 142 and 144. All of the interlocking photosites 140, 142, 144 and 146 preferably have the same surface area and are regularly spaced on the chips 10. Each interlocking photosite 140, 142, 144 and 146 preferably consists of one photodiode, photogate or other photodetection device. The advantage of this geometric configuration of the ninth embodiment is that it lowers the modulation transfer function in the x-direction or fast scan direction by spreading the photosites over larger regions, and thus reduces the Moiré patterns to improve image quality. In addition, all of the geometric centers of the interlocking photosites 140, 142, 144 and 146 are collinear and the outer interlocking photosites 140 and 146 are buttable, which further improves image quality. One chip 10 shown in FIG. 12 may be used independently in a scanning device or mounted to a substrate 20 with one or more chips 10 to form a full width linear array as shown in FIGS. 1 and 12.

Figure 13:
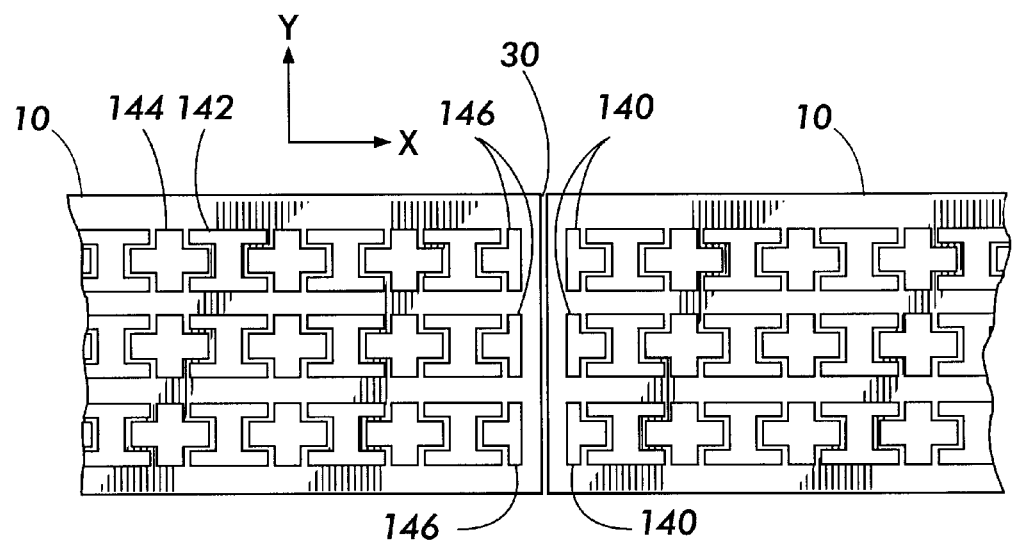
FIG. 13 is a plan view showing portions of two photosensitive arrays of photosites on two juxtaposed photosensitive chips in a tenth preferred embodiment of the present invention.

FIG. 13 shows a plan view of the relevant portions of two chips 10 at the general area of juxtaposition along a full width two dimensional photosensitive array comprising a plurality of the chips 10, each having a two dimensional photosensitive array of the geometric shapes according to the tenth embodiment of the present invention. In the tenth embodiment, the photosensitive array is a two dimensional array of interlocking photosites 140, 142, 144 and 146. Preferably, the two dimensional array has three rows of interlocking photosites 140, 142, 144 and 146 for the three primary colors. Each chip 10 has first interlocking photosites 140 and last interlocking photosites 146. The first interlocking photosites 140 and the last interlocking photosites 146 are also called outer interlocking photosites. The outer interlocking photosites 140 and 146 are parallel to the chip edge. The other interlocking photosites are called inner interlocking photosites and are denoted as 142 and 144. All of the interlocking photosites 140, 142, 144 and 146 preferably have the same surface area and are regularly spaced on the chips 10. Each interlocking photosite 140, 142, 144 and 146 preferably consists of one photodiode, photogate or other photodetection device. The advantage of this geometric configuration of the tenth embodiment is that it lowers the modulation transfer function in the x-direction or fast scan direction by spreading the photosites over larger regions, and thus reduces the Moiré patterns to improve image quality. In addition, all of the geometric centers of the interlocking photosites 140, 142, 144 and 146 are collinear and the outer interlocking photosites 140 and 146 are buttable, which further improves image quality. One chip 10 shown in FIG. 13 may be used in a scanning device or mounted to a substrate 20 with one or more chips 10 to form a full width two dimensional array as shown in FIGS. 1 and 13.

Figure 14:
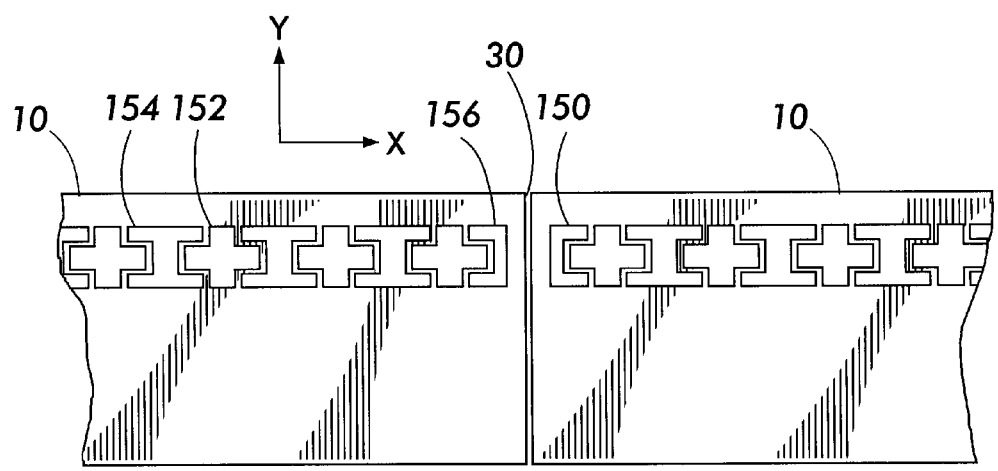
FIG. 14 is a plan view showing portions of two photosensitive arrays of photosites on two juxtaposed photosensitive chips in an eleventh preferred embodiment of the present invention.

FIG. 14 shows a plan view of the relevant portions of two chips 10 at the general area of juxtaposition along a full width linear photosensitive array comprising a plurality of the chips 10, each having a linear photosensitive array of the geometric shapes according to the eleventh embodiment of the present invention. In the eleventh embodiment, the linear photosensitive array is an array of interlocking photosites 150, 152, 154 and 156. Each chip 10 has a first interlocking photosite 150 and a last interlocking photosite 156. The first interlocking photosite 150 and a last interlocking photosite 156 are also called outer interlocking photosites. The outer interlocking photosites 150 and 156 are parallel to the chip edge. The other interlocking photosites are called inner interlocking photosites and are denoted as 152 and 154. All of the interlocking photosites 150, 152, 154 and 156 preferably have the same surface area and are regularly spaced on the chips 10. Each interlocking photosite 150, 152, 154 and 156 preferably consists of one photodiode, photogate or other photodetection device. The advantage of this geometric configuration of the eleventh embodiment is that it lowers the modulation transfer function in the x-direction or fast scan direction by spreading the photosites over larger regions, and thus reduces the Moiré patterns to improve image quality. In addition, all of the geometric centers of the interlocking photosites 150, 152, 154 and 156 are collinear and the outer interlocking photosites 150 and 156 are buttable, which further improves image quality. One chip 10 shown in FIG. 14 may be used in a scanning device or mounted to a substrate 20 with one or more chips 10 to form a full width linear array as shown in FIGS. 1 and 14.

Figure 15:
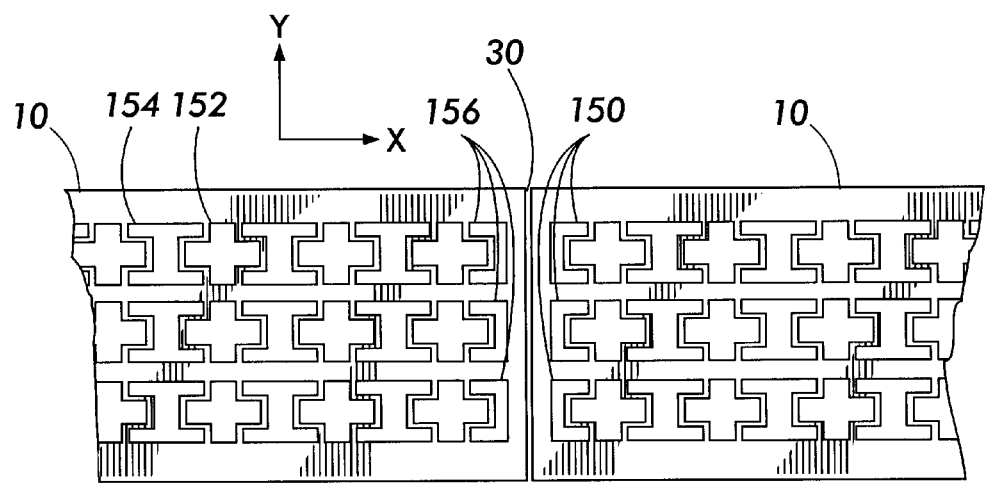
FIG. 15 is a plan view showing portions of two photosensitive arrays of photosites on two juxtaposed photosensitive chips in a twelfth preferred embodiment of the present invention.

FIG. 15 shows a plan view of the relevant portions of two chips 10 at the general area of juxtaposition along a full width linear two dimensional photosensitive array comprising a plurality of the chips 10, each having a two dimensional photosensitive array of the geometric shapes according to the twelfth embodiment of the present invention. In the twelfth embodiment, the photosensitive array is a two dimensional array of interlocking photosites 150, 152, 154 and 156. Each chip 10 has first interlocking photosites 150 and last interlocking photosites 156. The first interlocking photosites 150 and the last interlocking photosites 156 are also called outer interlocking photosites. The outer interlocking photosites 150 and 156 are parallel to the chip edge. The other interlocking photosites are called inner interlocking photosites and are denoted as 152 and 154. Preferably, the two dimensional array has three rows of interlocking photosites 150, 152, 154 and 156 for the three primary colors. All of the interlocking photosites 150, 152, 154 and 156 preferably have the same surface area and are regularly spaced on the chips 10. Each interlocking photosite 150, 152, 154 and 156 preferably consists of one photodiode, photogate or other photodetection device. The advantage of this geometric configuration of the twelfth embodiment is that it lowers the modulation transfer function in the x-direction or fast scan direction by spreading the photosites over larger regions, and thus reduces the Moiré patterns to improve image quality. In addition, all of the geometric centers of the interlocking photosites 150, 152, 154 and 156 are collinear and the outer interlocking photosites 150 and 156 are buttable, which further improves image quality. One chip 10 shown in FIG. 15 may be used in a scanning device or mounted to a substrate 20 with one or more chips 10 to form a full width two dimensional array as shown in FIGS. 1 and 15.

Moreover, it is understood that one or more rows of interlocking photosites shown in FIG. 12 may be substituted for one or more rows of interlocking photosites shown in FIG. 15. It is further understood that one or more rows of interlocking photosites shown in FIG. 14 may be substituted for one or more rows of interlocking photosites in FIG. 13.

Figure 16:
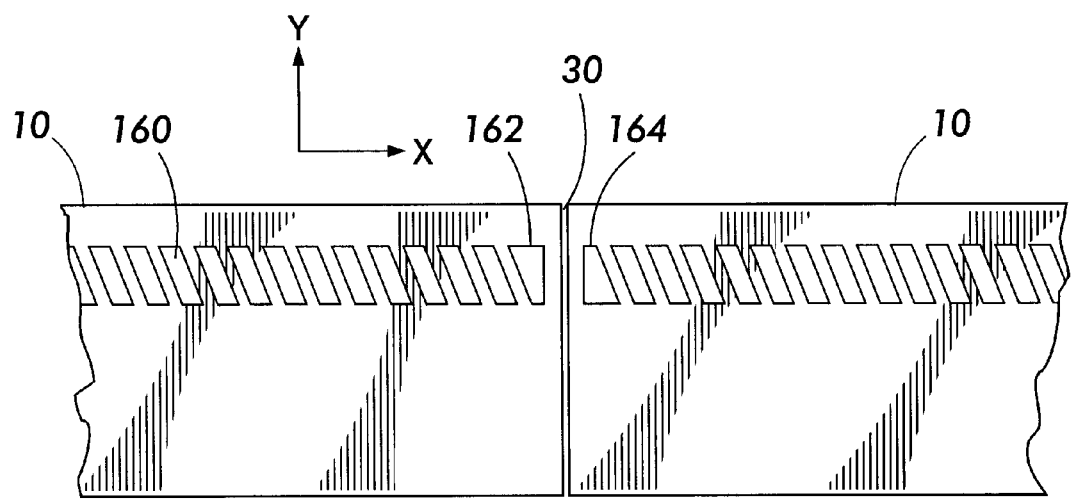
FIG. 16 is a plan view showing portions of two photosensitive arrays of photosites on two juxtaposed photosensitive chips in a thirteenth preferred embodiment of the present invention.

FIG. 16 shows a plan view of the relevant portions of two chips 10 at the general area of juxtaposition along a full width linear photosensitive array comprising a plurality of the chips 10, each having a linear photosensitive array of the geometric shapes according to the thirteenth embodiment of the present invention. In the thirteenth embodiment, the linear photosensitive array is an array of photosites on the chip 10 extending from one end of the chip 10 to the other including slanted photosites 160 and end photosites 162, 164. The slanted photosites 160 being generally in the shape of a parallelogram without right angles, and the end photosites 162, 164 being generally in the shape of a trapezoid having a first edge, a second edge, an inner edge facing the slanted photosites and outer edge facing the chip end, wherein the outer edge forms two ninety degree angles with the first and second edges. Also, the outer edge is preferably shorter than the inner edge. Each photosite has a photodetection device such as a photodiode or photogate. All of the photosites bridge adjacent photocollection areas 165 to spread the surface area of the photosites over a larger region. All of the photosites preferably have the same surface area on the chips 10. The advantage of this geometric configuration of the thirteenth embodiment is that it lowers the modulation transfer function in the x-direction or fast scan direction by spreading the photosites over larger regions, and thus reduces the Moiré patterns to improve image quality. In addition, the geometric centers of all of the photosites are preferably collinear and uniformly spaced. Also, the end photosites 162, 164 are buttable. These items further improve image quality. One chip 10 shown in FIG. 16 may be used in a scanning device or mounted to a substrate 20 with one or more chips 10 to form a full width linear array as shown in FIGS. 1 and 16.

Figure 17:
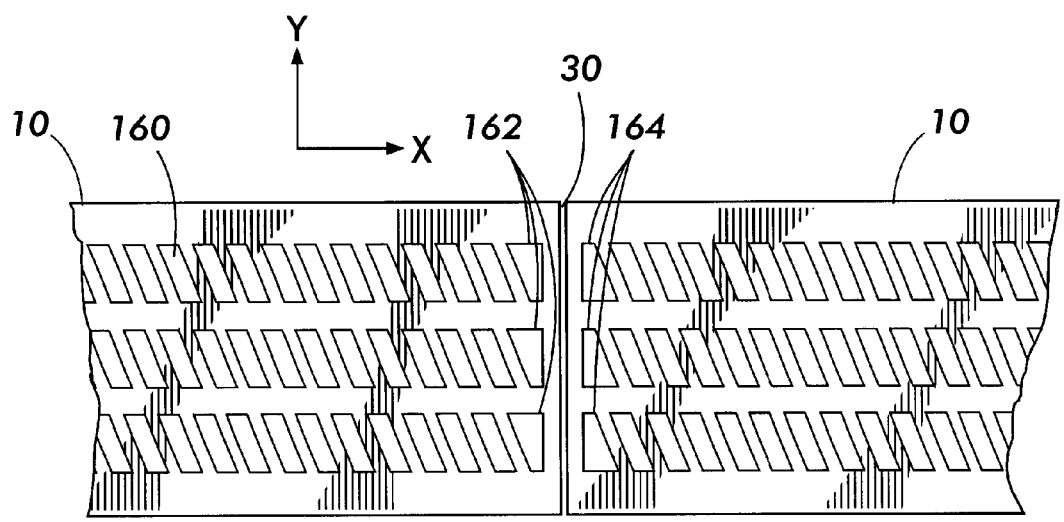
FIG. 17 is a plan view showing portions of two photosensitive arrays of photosites on two juxtaposed photosensitive chips in a fourteenth preferred embodiment of the present invention.

FIG. 17 shows a plan view of the relevant portions of two chips 10 at the general area of juxtaposition along a full width two dimensional photosensitive array comprising a plurality of the chips 10, each having a two dimensional photosensitive array of the geometric shapes according to the fourteenth embodiment of the present invention. In the fourteenth embodiment, the two dimensional photosensitive array is an array of photosites on the chip 10 extending from one end of the chip 10 to the other including slanted photosites 160 and end photosites 162, 164. The slanted photosites 160 being generally in the shape of a parallelogram without right angles, and the end photosites 162, 164 being generally in the shape of a trapezoid having a first edge, a second edge, an inner edge facing the slanted photosites and outer edge facing the chip end, wherein the outer edge forms two ninety degree angles with the first and second edges. Also, the outer edge is preferably shorter than the inner edge. Preferably, there are three rows of photosites 160, 162 and 164 for the three primary colors. Each photosite has a photodetection device such as a photodiode or photogate. All of the photosites bridge adjacent photocollection areas 165 to spread the surface area of the photosites over a larger region. All of the photosites preferably have the same surface area on the chips 10. The advantage of this geometric configuration of the fourteenth embodiment is that it lowers the modulation transfer function in the x-direction or fast scan direction by spreading the photosites over larger regions, and thus reduces the Moiré patterns to improve image quality. In addition, the geometric centers of all of the photosites are preferably collinear and uniformly spaced. Also, the end photosites 162, 164 are buttable. These items further improve image quality. One chip 10 shown in FIG. 17 may be used in a scanning device or mounted to a substrate 20 with one or more chips 10 to form a full width two dimensional array as shown in FIGS. 1 and 17.

Figure 18:
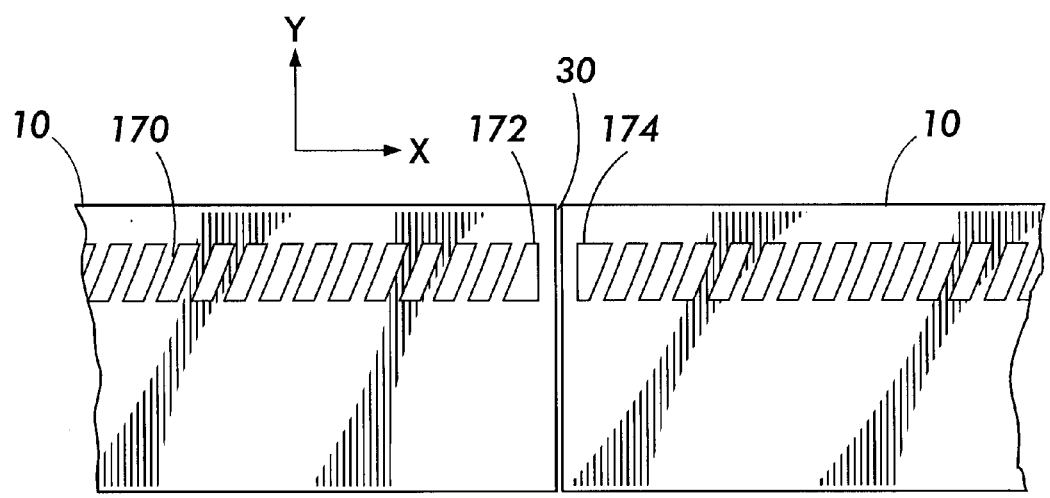
FIG. 18 is a plan view showing portions of two photosensitive arrays of photosites on two juxtaposed photosensitive chips in a fifteenth preferred embodiment of the present invention.

FIG. 18 shows a plan view of the relevant portions of two chips 10 at the general area of juxtaposition along a full width linear photosensitive array comprising a plurality of the chips 10, each having a linear photosensitive array of the geometric shapes according to the fifteenth embodiment of the present invention. In the fifteenth embodiment, the linear photosensitive array is an array of photosites on the chip 10 extending from one end of the chip 10 to the other including slanted photosites 170 and end photosites 172, 174. The slanted photosites 170 being generally in the shape of a parallelogram without right angles, and the end photosites 172, 174 being generally in the shape of a trapezoid having a first edge, a second edge, an inner edge facing the slanted photosites and outer edge facing the chip end, wherein the outer edge forms two ninety degree angles with the first and second edges. Also, the outer edge is preferably shorter than the inner edge. Each photosite has a photodetection device such as a photodiode or photogate. All of the photosites bridge adjacent photocollection areas 175 to spread the surface area of the photosites over a larger region. All of the photosites preferably have the same surface area on the chips 10. The advantage of this geometric configuration of the fifteenth embodiment is that it lowers the modulation transfer function in the x-direction or fast scan direction by spreading the photosites over larger regions, and thus reduces the Moiré patterns to improve image quality. In addition, the geometric centers of all of the photosites are preferably collinear and uniformly spaced. Also, the end photosites 172, 174 are buttable. These items further improve image quality. One chip 10 shown in FIG. 18 may be used in a scanning device or mounted to a substrate 20 with one or more chips 10 to form a full width linear array as shown in FIGS. 1 and 18.

Figure 19:
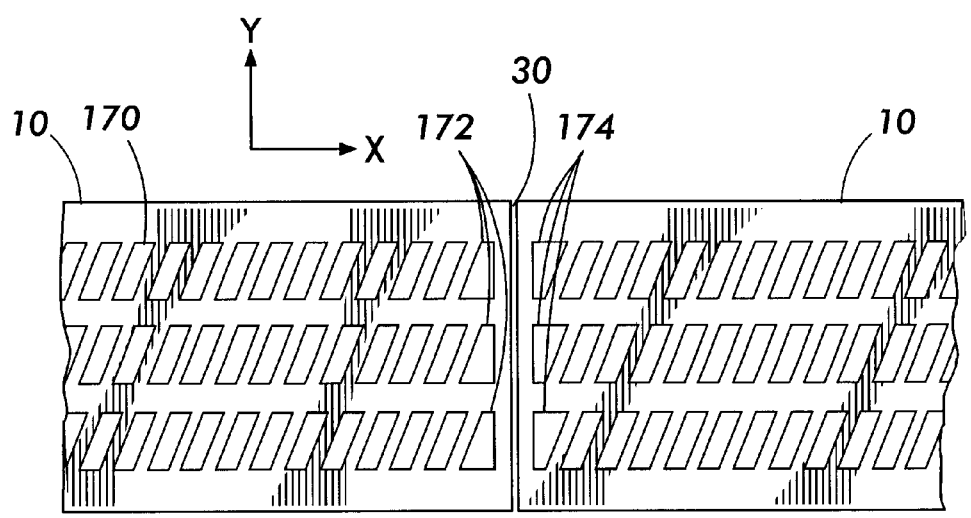
FIG. 19 is a plan view showing portions of a photosensitive array of photosites on two juxtaposed photosensitive chips in a sixteenth preferred embodiment of the present invention.

FIG. 19 shows a plan view of the relevant portions of two chips 10 at the general area of juxtaposition along a full width two dimensional photosensitive array comprising a plurality of the chips 10, each having a two dimensional photosensitive array of the geometric shapes according to the sixteenth embodiment of the present invention. In the sixteenth embodiment, the photosensitive array is an array of photosites on the chip 10 extending from one end of the chip 10 to the other including slanted photosites 170 and end photosites 172, 174. The slanted photosites 170 being generally in the shape of a parallelogram without right angles, and the end photosites 172, 174 being generally in the shape of a trapezoid having a first edge, a second edge, an inner edge facing the slanted photosites and outer edge facing the chip end, wherein the outer edge forms two ninety degree angles with the first and second edges. Also, the outer edge is preferably shorter than the inner edge. Preferably, there are three rows of photosites 170, 172 and 174 for the three primary colors. Each photosite has a photodetection device such as a photodiode or photogate. All of the photosites bridge adjacent photocollection areas 175 to spread the surface area of the photosites over a larger region. All of the photosites preferably have the same surface area on the chips 10. The advantage of this geometric configuration of the sixteenth embodiment is that it lowers the modulation transfer function in the x-direction or fast scan direction by spreading the photosites over larger regions, and thus reduces the Moiré patterns to improve image quality. In addition, the geometric centers of all of the photosites are preferably collinear and uniformly spaced. Also, the end photosites 172, 174 are buttable. These items further improve image quality. One chip 10 shown in FIG. 19 may be used in a scanning device or mounted to a substrate with one or more chips 10 to form a full width two dimensional array as shown in FIGS. 1 and 19.

Moreover, it is understood that one or more rows of slanted photosites shown in FIG. 16 may be substituted for one or more rows of slanted photosites shown in FIG. 19. It is further understood that one or more rows of slanted photosites shown in FIG. 18 may be substituted for one or more rows of slanted photosites in FIG. 17.

Figure 20:
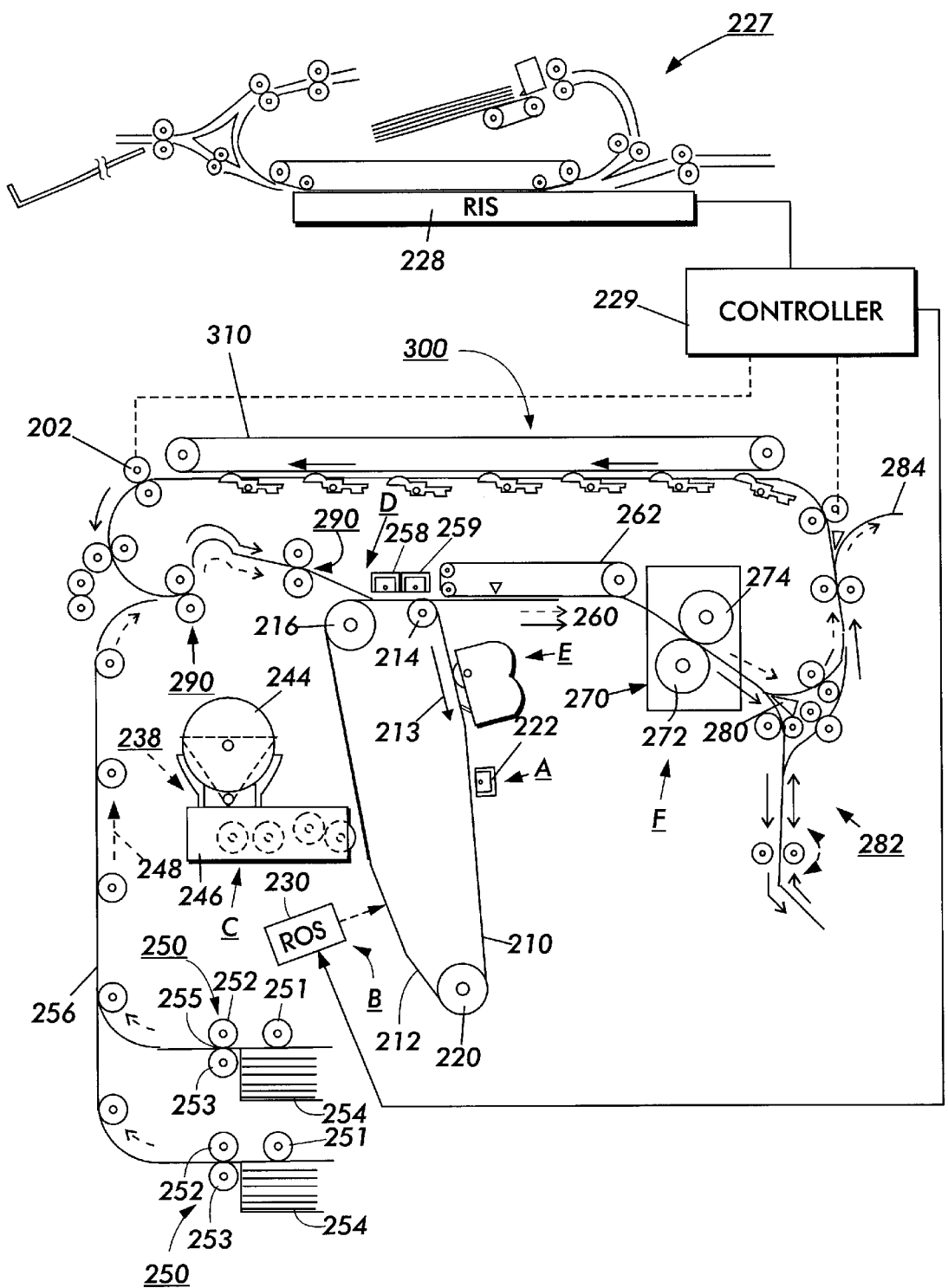
FIG. 20 is a partial schematic elevational view of a digital copier, which employs photosensitive chips of the present invention.

FIG. 20 is a partial schematic elevational view of a digital copier, which can utilize the photosensitive chips 10 of the present invention. However, it is understood that the photosensitive chips may be used in any imaging device.

An original document is positioned in a document handler 227 on a raster input scanner (RIS) indicated generally by reference numeral 228. The RIS contains document illumination lamps, optics, a mechanical scanning device and a plurality of photosensitive chips 10 as shown in FIG. 1. The photosensitive chips 10 may include any one of the photosensitive arrays described above. The RIS captures the entire original document and converts it to a series of raster scan lines. This information is transmitted to an electronic subsystem (ESS) which controls a raster output scanner (ROS).

The digital copier employs a photoconductive belt 210. Preferably, the photoconductive belt 210 is made from a photoconductive material coated on a ground layer, which, in turn, is coated on an anti-curl backing layer. Belt 210 moves in the direction of arrow 213 to advance successive portions sequentially through the various processing stations disposed about the path of movement thereof. Belt 210 is entrained about stripping roller 214, tensioning roller 220 and drive roller 216. As roller 216 rotates, it advances belt 210 in the direction of arrow 213.

Initially, a portion of the photoconductive surface passes through charging station A. At charging station A, a corona generating device indicated generally by the reference numeral 222 charges the photoconductive belt 210 to a relatively high, substantially uniform potential.

At an exposure station B, a controller or electronic subsystem (ESS), indicated generally by reference numeral 229, receives the image signals representing the desired output image and processes these signals to convert them to a continuous tone or grayscale rendition of the image which is transmitted to a modulated output generator, for example the raster output scanner (ROS), indicated generally by reference numeral 230. Preferably, ESS 229 is a self-contained, dedicated minicomputer. The image signals transmitted to ESS 229 may originate from a RIS 228 as described above or another type of scanner utilizing the photosensitive chips 10, thereby enabling the digital copier to serve as a remotely located printer for one or more scanners. Alternatively, the printer may serve as a dedicated printer for a high-speed computer or for one or more personal computers. The signals from ESS 229, corresponding to the continuous tone image desired to be reproduced by the printer, are transmitted to ROS 230. ROS 230 includes a laser with rotating polygon mirror blocks. The ROS 230 will expose the photoconductive belt 210 to record an electrostatic latent image thereon corresponding to the continuous tone image received from ESS 229. As an alternative, ROS 230 may employ a photosensitive array of light emitting diodes (LEDs) arranged to illuminate the charged portion of photoconductive belt 210 on a raster-by-raster basis.

After the electrostatic latent image has been recorded on photoconductive surface 212, belt 210 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 244, dispenses toner particles into developer housing 246 of developer unit 238.

With continued reference to FIG. 13, after the electrostatic latent image is developed, -the toner powder image present on belt 210 advances to transfer station D. A print sheet 248 is advanced to the transfer station, D, by a sheet feeding apparatus 250. Preferably, sheet feeding apparatus 250 includes a nudger roll 251 which feeds the uppermost sheet of stack 254 to nip 255 formed by feed roll 252 and retard roll 253. Feed roll 252 rotates to advance the sheet from stack 254 into vertical transport 256. Vertical transport 256 directs the advancing sheet 248 of support material into the registration transport 290 and past image transfer station D to receive an image from photoreceptor belt 210 in a timed sequence so that the toner powder image formed thereon contacts the advancing sheet 248 at transfer station D. Transfer station D includes a corona generating device 258, which sprays ions onto the back side of sheet 248. This attracts the toner powder image from photoconductive surface 212 to sheet 248. The sheet is then detached from the photoreceptor by corona generating device 259 which sprays oppositely charged ions onto the back side of sheet 248 to assist in removing the sheet from the photoreceptor. After transfer, sheet 248 continues to move in the direction of arrow 260 by way of belt transport 262, which advances sheet 248 to fusing station F.

Fusing station F includes a fuser assembly indicated generally by the reference numeral 270 which permanently affixes the transferred toner powder image to the copy sheet. Preferably, fuser assembly 270 includes a heated fuser roller 272 and a pressure roller 274 with the powder image on the copy sheet contacting fuser roller 272. The pressure roller 274 is loaded against the fuser roller 272 to provide the necessary pressure to fix the toner powder image to the copy sheet. The fuser roller 272 is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 272. Or alternatively, release agent is stored in a presoaked web (not shown) and applied to the fuser roll 272 by pressing the web against fuser roll 272 and advancing the web at a slow speed.

The sheet then passes through fuser 270 where the image is permanently fixed or fused to the sheet. After passing through fuser 270, a gate 280 either allows the sheet to move directly via output 284 to a finisher or stacker, or deflects the sheet into the duplex path 300, specifically, first into single sheet inverter 282 here. That is, if the sheet is either a simplex sheet or a completed duplex sheet having both side one and side two images formed thereon, the sheet will be conveyed via gate 280 directly to output 284. However, if the sheet is being duplexed and is then only printed with a side one image, the gate 280 will be positioned to deflect that sheet into the inverter 282 and into the duplex loop path 300, where that sheet will be inverted and then fed to acceleration nip 202 and belt transports 310, for recirculation back through transfer station D and fuser 270 for receiving and permanently fixing the side two image to the backside of that duplex sheet, before it exits via exit path 284.

After the print sheet is separated from photoconductive surface 212 of belt 210, the residual toner/developer and paper fiber particles adhering to photoconductive surface 212 are removed therefrom at cleaning station E. Cleaning station E includes a rotatably mounted fibrous brush in contact with photoconductive surface 212 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 212 with light to dissipate any residual electrostatic charge remaining thereon prior to the charging thereof for the next successive imaging cycle.

Controller 229 regulates the various printer functions. The controller 229 is preferably a programmable microprocessor which controls all of the printer functions hereinbefore described. The controller 229 provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

We claim:

1. A photosensitive array having fast and slow scan directions, the photosensitive array comprising:

a chip; and an array of interlocking photosites on the chip, wherein each photosite has a photodetection device, each photosite has the same surface area and the photosites are substantially collinear along the fast-scan direction, and wherein each photosite in the array includes a border defining least one substantially right angle adjacent a neighboring photosite, the neighboring photosite including a border which is complementary to the border of the photosite; and wherein each photosite includes a border which defines a tab adjacent a neighboring photosite, the tab defining at least two right angles.

2. The photosensitive array as in claim 1, wherein;

the interlocking photosites on the chip extend from one end of the chip to the other;

the interlocking photosites are buttable; and the interlocking photosites are especially adapted for end to end assembly with like arrays to form a full width array.

3. The photosensitive array as in claim 1, wherein at least a subset of the photosites in the array are substantially cross-shaped.

4. A photosensitive array having fast and slow scan directions, the photosensitive array comprising:

a chip; and a plurality of arrays of interlocking photosites on the chip, wherein, for each array, each photosite has a photodetection device, each photosite has the same surface area and the photosites are substantially collinear along the fast-scan direction, and wherein each photosite in the array includes a border defining least one substantially right angle adjacent a neighboring photosite, the neighboring photosite including a border which is complementary to the border of the photosite; and wherein each photosite includes a border which defines a tab adjacent a neighboring photosite, the tab defining at least two right angles.

5. The photosensitive array of claim 4, wherein at least a subset of the photosites in each array are substantially cross-shaped.

6. The photosensitive array of claim 4, wherein a first array is adapted to receive light of a first color and a second array is adapted to receive light of a second color.

* * * * *